United States Patent
Wiley et al.

(10) Patent No.: US 9,809,960 B2
(45) Date of Patent: *Nov. 7, 2017

(54) UNDERGROUND WATER-STORAGE VAULT AND METHOD FOR INSTALLING SAME

(71) Applicant: BLACK DIAMOND ECO SOLUTIONS, LLC, Eastlake, OH (US)

(72) Inventors: Jay Wiley, Mentor, OH (US); Alec Janda, Chagrin Falls, OH (US); Scott Janda, Chagin Falls, OH (US); Timothy Reed, Northfield Center, OH (US)

(73) Assignee: Black Diamond Eco Solutions, LLC, Eastlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,542

(22) Filed: Dec. 7, 2016

(65) Prior Publication Data

US 2017/0081830 A1    Mar. 23, 2017

Related U.S. Application Data

(63) Continuation of application No. 14/817,659, filed on Aug. 4, 2015, now Pat. No. 9,522,784.

(Continued)

(51) Int. Cl.

| | |
|---|---|
| *E03B 11/14* | (2006.01) |
| *E03F 1/00* | (2006.01) |
| *E03B 3/03* | (2006.01) |
| *B65G 5/00* | (2006.01) |
| *E03B 11/00* | (2006.01) |
| *E03B 11/02* | (2006.01) |
| *B65D 88/54* | (2006.01) |

(Continued)

(52) U.S. Cl.
CPC .............. *E03B 3/03* (2013.01); *B65D 88/54* (2013.01); *B65D 88/76* (2013.01); *B65D 90/105* (2013.01); *B65G 5/00* (2013.01); *E03B 11/00* (2013.01); *E03B 11/02* (2013.01); *E03F 1/003* (2013.01); *E03F 1/005* (2013.01); *E03B 11/14* (2013.01); *E04H 7/02* (2013.01)

(58) Field of Classification Search
CPC ........... E03F 1/003; E03F 1/005; E03B 11/00; E03B 11/14
USPC ...................................... 405/50, 53
See application file for complete search history.

(56) References Cited

U.S. PATENT DOCUMENTS

| | | | | |
|---|---|---|---|---|
| 4,988,235 A | * | 1/1991 | Hurley .................... | C02F 3/208 210/164 |
| 5,580,173 A | * | 12/1996 | Sebastian ............... | B65D 31/10 383/119 |

(Continued)

FOREIGN PATENT DOCUMENTS

DE     20201200567     *   9/2012

*Primary Examiner* — Frederick L Lagman
(74) *Attorney, Agent, or Firm* — Rankin, Hill & Clark LLP

(57) ABSTRACT

An underground water-storage system that includes a sump having a base and sidewalls that cooperate to define an open-topped box that defines a reservoir, a plurality of plastic water matrices each defining a void space for receiving water, and a lid. The sump and lid are formed of a reinforced geomembrane material and include welds and are prefabricated in a location remote from an installation site of the underground water-storage vault more than two days prior to installation.

15 Claims, 4 Drawing Sheets

Related U.S. Application Data

(60) Provisional application No. 62/032,849, filed on Aug. 4, 2014.

(51) Int. Cl.
  B65D 88/76 (2006.01)
  B65D 90/10 (2006.01)
  E04H 7/02 (2006.01)

(56) References Cited

U.S. PATENT DOCUMENTS

| | | | | |
|---|---|---|---|---|
| 5,664,887 A * | 9/1997 | LaFleur | ............ | B65D 88/1631 |
| | | | | 383/119 |
| 5,848,856 A * | 12/1998 | Bohnhoff | ................ | E02B 11/00 |
| | | | | 405/36 |
| 6,095,718 A | 8/2000 | Bohnhoff | | |
| 6,276,093 B1 | 8/2001 | Janesky | | |
| 6,428,870 B1 * | 8/2002 | Bohnhoff | ................ | E02B 11/00 |
| | | | | 405/50 |
| 6,648,549 B1 * | 11/2003 | Urriola | ................... | E03F 1/005 |
| | | | | 210/170.03 |
| 6,779,946 B1 * | 8/2004 | Urriola | ................... | E01C 9/004 |
| | | | | 404/2 |
| 7,080,480 B2 * | 7/2006 | Urban | ................ | A01G 13/0237 |
| | | | | 210/170.03 |
| 7,591,610 B2 * | 9/2009 | Krichten | ................. | E03F 1/005 |
| | | | | 405/43 |
| 7,686,540 B2 * | 3/2010 | Urriola | ................. | E01C 11/225 |
| | | | | 404/4 |
| 8,162,567 B2 * | 4/2012 | Obermeyer | ............ | E03F 1/002 |
| | | | | 405/43 |
| 8,240,950 B1 * | 8/2012 | Everson | ................... | E03B 3/03 |
| | | | | 210/170.08 |
| 8,926,218 B1 * | 1/2015 | Savage | .................. | E03B 11/04 |
| | | | | 137/236.1 |
| 9,522,784 B2 * | 12/2016 | Wiley | ...................... | B65G 5/00 |
| 2006/0242915 A1 * | 11/2006 | Frost | ...................... | E03F 1/005 |
| | | | | 52/169.5 |
| 2007/0031192 A1 * | 2/2007 | Murfin | ................... | E03F 1/002 |
| | | | | 405/43 |
| 2009/0279953 A1 * | 11/2009 | Allard | ..................... | E03F 1/005 |
| | | | | 405/39 |
| 2010/0021236 A1 * | 1/2010 | Kreikemeier | ........... | E03F 1/005 |
| | | | | 405/55 |
| 2010/0294705 A1 * | 11/2010 | Henry | .................... | E02B 11/00 |
| | | | | 210/170.07 |
| 2010/0300019 A1 * | 12/2010 | Lowe | ..................... | E03F 1/005 |
| | | | | 52/173.1 |
| 2012/0321390 A1 * | 12/2012 | Orme | ................. | B29B 17/0042 |
| | | | | 405/53 |

\* cited by examiner

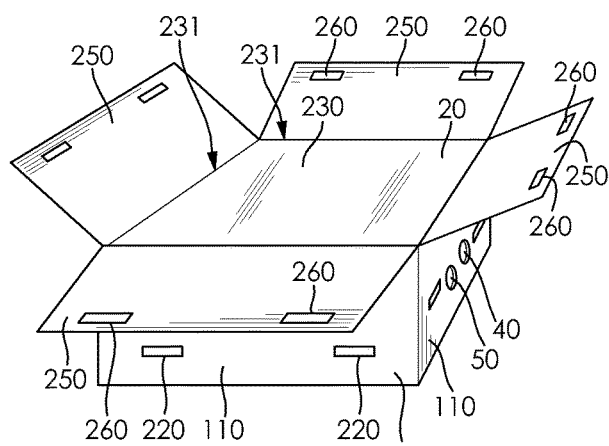
FIG. 6
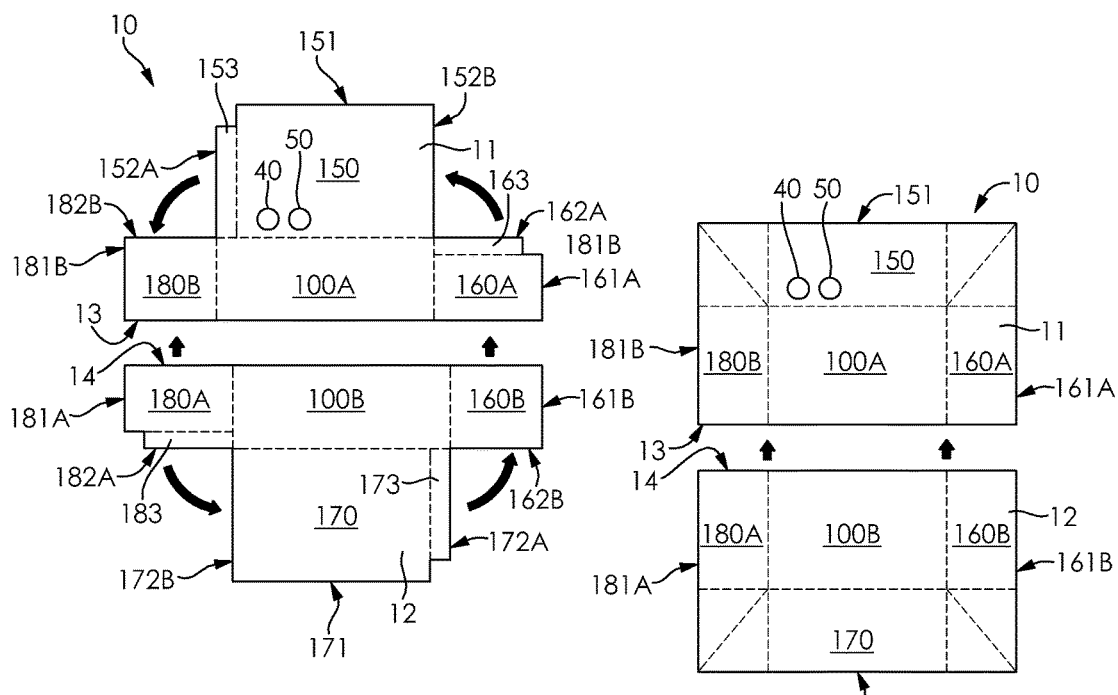
FIG. 7
FIG. 8

UNDERGROUND WATER-STORAGE VAULT AND METHOD FOR INSTALLING SAME

CROSS-REFERENCE TO RELATED APPLICATIONS

This application is a continuation of U.S. Non-provisional patent application Ser. No. 14/817,659, filed Aug. 4, 2015, now U.S. Pat. No. 9,522,784 B2, issued Dec. 20, 2016, and claims priority to U.S. Provisional Patent Application Ser. No. 62/032,849, flied Aug. 4, 2014, which is incorporated herein by reference.

BACKGROUND OF INVENTION

Field of Invention

The present invention relates to underground water-storage vaults, systems, and methods for installing the same.

Brief Description of Related Art

Conventional underground water-storage vaults are constructed using flexible water-impermeable films/membranes, which are commonly referred to in the art as geomembrane material. The water-impermeable films can be single- or multi-layer constructions and are generally provided as continuous rolls of flat material of various widths as desired for particular applications. These applications can include the collection of rainwater for subsequent irrigation use and/or to provide a water source for landscaping water features, e.g. pond-free waterfalls.

Conventional methods for installing underground water-storage vaults generally begin with excavating a suitably sized hole in the ground. A sheet of geotextile fabric material and a sheet of water-impermeable membrane material are folded and manipulated by hand to line the opening in the ground and thereby form a sump. Next, a desired number of plastic matrices, which are typically assembled on-site, are placed into the lined opening in the ground. Typically, a pump housing unit for receiving a pump is placed in the lined opening, wherein the plastic matrices are adjacent to, or partially surrounding, the pump housing unit. A pump is then placed in the pump housing unit. The remaining sheets of geotextile fabric and membrane are gathered around the plastic mastrices, and then soil or other material is then backfilled outside the geotextile fabric and membrane. The backfill material laterally presses against the outside surface of the membrane to compact the matrices in a block arrangement inside the water-impermeable membrane. The matrices provide structural support to the flexible water-impermeable membrane so that the membrane does not collapse under the pressure from the backfill, and so that the sump can retain a certain volume to accept the influx of water.

In these conventional methods, the water-impermeable membrane is provided as a roll of flexible flat membrane material, and installation therefore includes attempting to conform the flat membrane material to the contoured surfaces of the excavated hole. This process necessarily results in excess membrane material bunching up and folding upon itself as the membrane material is conformed in the contours of the excavated hole.

In one conventional application, the excess membrane material is drawn up over the top of the matrices and welded to itself on the installation site in order to seal the membrane material and enclose the sump. In another conventional application, the membrane material is not sealed, but is left open at the top. A water-permeable geotextile fabric is applied over the open sump to cover the matrices. The geotextile fabric is then covered with a permeable layer of gravel, pavers and/or soil in order to conceal the water reservoir below the grade of the soil. In this scenario, any water that permeates the geotextile fabric due to gravity will then accumulate in the sump. Openings are cut into the water-impermeable membrane at the installation site to accommodate plumbing fittings to connect to water inlet and outlet conduits.

While the membrane material is flexible and thus can be advantageously rolled up to save space and costs for transportation purposes, the current methods of installing underground water-storage vaults are nevertheless time-consuming, imprecise, and result in the waste of membrane material due to the bunching and folding of the membrane material as it is conformed over the contours of the excavated hole. These excessive amounts of membrane material used to form the sump are unnecessary and result in the waste of money, time, and precious natural resources used to make the membranes. Improvements are needed.

BRIEF SUMMARY OF THE INVENTION

In view of the foregoing, the present invention provides underground water-storage vaults, systems and methods for installing the same that result in decreased use of membrane material and save on money, time, and effort during installation. In accordance with the present subject matter, the underground water-storage vaults comprise a sump in the form of an open-topped box, and a lid for covering the open top of the sump. In some embodiments, the lid is removable. In other embodiments, the lid is joined to or formed as part of the box. The sump and lid are formed of a flexible membrane material, and are structurally supported by a plurality of matrices positioned in an interior of the sump and covered with the lid to form the vault. The matrices define an open space in the vault configured to accept water. The sump and lid are prefabricated at a location remote from the installation site of the underground water-storage vault, and are transported to the installation site in the prefabricated state. This avoids the time time and effort incurred at the installation site that would otherwise be spent attempting to form a sump by conventional methods. In addition, the sump includes welded seams that provide the open-topped box shape to the sump, thereby minimizing the use of excess membrane material in the formation of the sump.

In one embodiment, the present subject matter provides an underground water-storage system comprising a sump, a plurality of matrices, and a lid. The sump is formed of a flexible membrane that is impermeable to liquid water. The sump includes a substantially rectangular base and sidewalls extending from a perimeter of the base. Edges of adjacent sidewalls are welded to each other. The each of the plurality of matrices define a void space configured to receive water. The plurality of matrices is positioned in the sump, and thereby provides structural support to the flexible membrane. When structurally supported, the base and sidewalls cooperate with each other to define a reservoir for water that is in a form of a substantially rectangular box with an open top. The lid covers the open top of the sump. At least one of the lid or the sump includes at least one aperture providing fluid communication between the reservoir and an exterior of the sump. The sump and lid are prefabricated more than two days prior to installation of the underground water-storage system at a location remote from the installation site of the underground water-storage system, and delivered in a prefabricated state to the installation site for use.

In another embodiment, the present subject matter provides a method for installing a water-storage system. The method comprises providing a water-storage system including a sump, a plurality of matrices, and a lid. The sump is formed of a flexible membrane that is impermeable to liquid water. The sump includes a base and sidewalls extending from the base. Edges of adjacent sidewalls are welded to each other. The each of the plurality of matrices define a void space configured to receive water. The sump and the lid are prefabricated at a location remote from an installation site of the water-storage system more than two days prior to installation, and delivered in a prefabricated state to the installation site. The method includes excavating a hole in the ground at the installation site. The prefabricated sump is placed in the hole and the plurality of matrices is positioned in the sump to provide structural support to the sump, such that the base and sidewalls cooperate to define a reservoir for water in a shape of a substantially rectangular box with an open top. The lid is positioned in order to cover the open top of the box, thereby forming a water-storage system. The water-storage system is covered with material to conceal it from view. At least one of the lid or the sump includes at least one aperture providing fluid communication between the reservoir and an exterior of the sump.

The foregoing and other features of the invention are hereinafter more fully described below and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

With reference to the accompanying drawing figures, please note that:

FIG. 6 is a schematic perspective view of a lid covering an open top of a sump according to an embodiment of the invention;

FIG. 7 is a top view of an exemplary cut pattern of membrane material prior to assembly into a prefabricated sump according to an embodiment of the invention;

FIG. 8. is a top view of an exemplary cut pattern of membrane material prior to assembly into a prefabricated sump according to another embodiment of the invention;

DETAILED DESCRIPTION OF THE INVENTION

Figure 1:
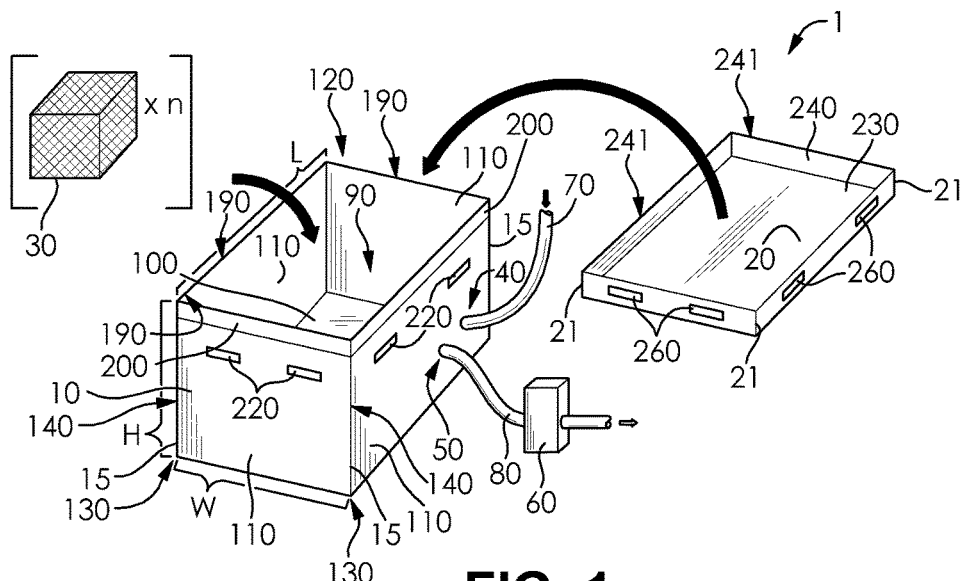
FIG. 1 is a schematic perspective view of a prefabricated underground water-storage system according to an embodiment of the invention.

The present subject matter provides underground storage vaults comprising a prefabricated sump and a removable lid. Both the sump and the removable lid are prefabricated remote from an installation site of the underground water-storage vault. As used herein, "remote from the installation site" means a location other than at the installation site of the underground water-storage vault, for example at a location that is at least 5 miles, at least 3 miles, or at least 1 mile from an excavated hole in the ground in which the vault will be installed. Preferably, the sump and lid are prefabricated more than a week prior to installation, and are transported to the installation site in the prefabricated state.

In several embodiments, the sump is formed from a flexible membrane material that is impermeable to liquid water in the shape of a substantially rectangular open-topped box. The flexible sump is structurally supported in the shape of a substantially rectangular open-topped box by a plurality of matrices positioned inside the sump. The term "substantially rectangular" should be understood to include squares, cubes, and other three-dimensional shapes that include corners having angles that meet at about 90°±20°.

As used herein, "impermeable to liquid water" means that the membrane has a hydrostatic resistance, as determined using ASTM D751, Procedure A, of at least 100 pounds per square inch ("psi").

As used herein relating to the membrane material, "flexible" means that without the plurality of matrices providing structural support to the membrane material, the membrane material would otherwise be incapable of forming the substantially rectangular box with an open top. Rather, the flexible membrane material would collapse under its own weight into a pile of membrane material not in the shape of a substantially rectangular open-topped box.

In one embodiment when the sump is structurally supported by the plurality of matrices, the sump defines a cavity or reservoir for water, which can be covered by a removable lid. As used herein, "removable" or cognate terms mean that the lid can be selectively and repeatedly attached/secured/fastened to the sump for covering the open top of the sump, and can be selectively and repeatedly separated/removed/disconnected/unfastened from the sump to expose the open top, all without damaging the lid or the sump. The sump is configured to have a predetermined size and shape in order to receive a predetermined number of matrices, wherein each of the matrices define a void space configured to receive water.

As will be appreciated, rather than conforming a flat membrane material to the contours of the excavated hole as is conventional, the present invention instead includes a prefabricated sump formed from membrane material, and having a predetermined size and shape (e.g. an open-topped box) to receive a predetermined number of matrices. More specifically, the sump is made so that its size and shape closely conform to the total size and shape of the plurality of matrices that will be placed within the sump.

Accordingly, the present invention limits the amount of membrane material that is used to make the sump, the amount being limited to that which is minimally required to accommodate the predetermined number of matrices. In this way, the present invention does not result in the use of excessive amounts of flat membrane material to form the sump, e.g. as a result of bunching or folding of material in contours of the excavation site, but instead provides a sump that exhibits little or no folding or bunching of the membrane material. In this way, the sumps can be formed from a minimal amount of membrane material, and waste is minimized.

In addition, the membrane material of the sump and lid is flexible, and thus the sump and lid can be rolled or folded for transportation to an installation site. This reduces transportation costs as compared to delivering rigid sumps made from rigid materials to an installation site.

In several installation methods, an excavation is made in the ground at the installation site and the flexible prefabricated sump is placed in the excavated hole. The predetermined number of matrices is then fittingly placed into the sump. That is, the matrices are closely aligned, stacked, or organized so as to occupy the smallest volume possible within the box. This close stacking of the matrices allows the sump to be prefabricated within tight dimensional specifications in order to save on the amount of membrane material used to make the sump. The lid is then removably secured to the prefabricated sump to cover the open top of the sump, and to form a closed vault around the matrices. The vault is structurally supported by the matrices and thus has a pre-determined capacity or volume commensurate with the volume of the stacked matrices. The excavated hole can be back-filled around and over the vault as in conventional installation techniques so that the vault is out of site.

The methods may include the formation of openings (i.e. "apertures") in the vault, wherein one or more apertures are formed through the membrane material in the prefabricated sump and/or in the lid. The apertures provide access to the interior of the vault for various purposes such as, for example, introducing or extracting water therefrom, allowing air to be displaced from or enter into the sump in response to changes in the volume of water in the sump and/or to allow for the presence of sensors and other measuring and/or monitoring equipment. The apertures can be formed either at the installation site or, more preferably, using computer numerical control ("CNC") technology at a location remote from the installation site (i.e. "at the remote site"). The openings can be for receiving plumbing fittings (e.g., an inlet from a water source such as a downspout, and an outlet to a pump, which can be stored external to the water-containing vault) or for other purposes as desired such as probes or measuring devices, such as those used to evaluate the water level or water temperature in the vault.

Pre-fabrication of the sump and lid at the remote site significantly reduces waste of water-impermeable membrane material by limiting the amount of membrane material used to make the sump and lid. Prefabrication also improves the speed, quality and ease of installation at the installation site because conventionally required steps of conforming the membrane material to the contours of the hole, drawing up the membrane material over the matrices, welding the membrane material, and forming apertures in the membrane material, are advantageously not required by the present invention.

Underground water-storage systems according to the present invention will now be described in more detail with reference to the various figures.

Figure 2:
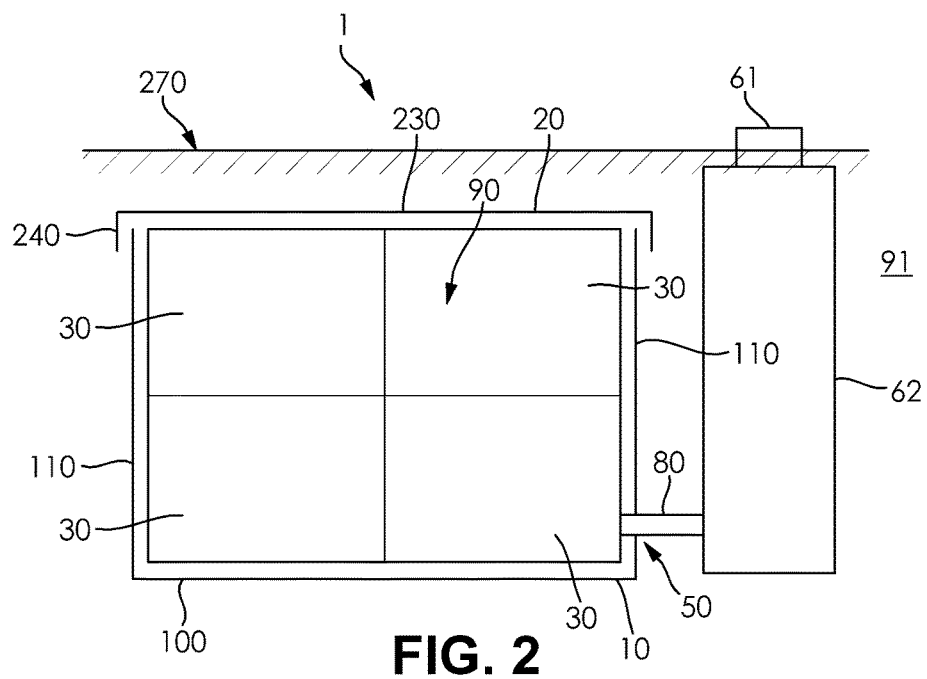
FIG. 2 is a cross-sectional view taken through an underground water-storage system according to an embodiment of the invention.
Figure 3:
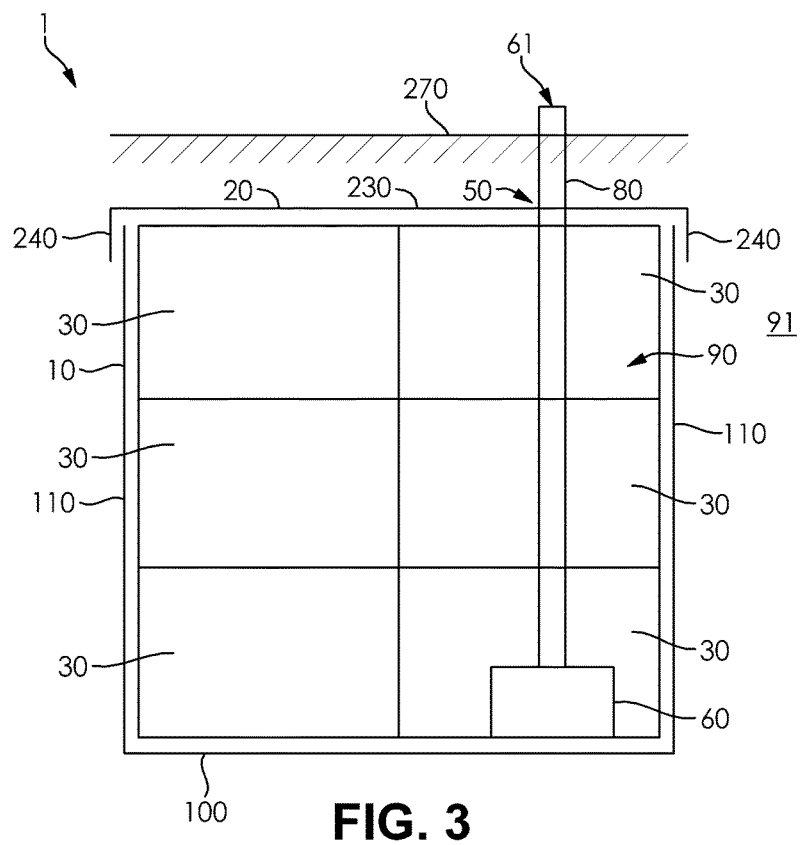
FIG. 3 is a cross-sectional view taken through an underground water-storage system according to another embodiment of the invention.

In several embodiments, and as shown for example in FIGS. 1-3, the underground water-storage system 1 includes a sump 10 made from a flexible water-impermeable membrane material and a removable lid 20, which can also be made from the same membrane material. The sump 10 and removable lid 20 are both prefabricated at a location that is remote from the installation site. The membrane material is water impermeable and has a hydrostatic resistance that in one embodiment is at least 100 pounds per square inch (psi), in another embodiment is at least 300 psi, and in still another embodiment is at least 800 psi as determined using ASTM D751, Procedure A.

The membrane material is not particularly limited by the present subject matter and can include a single- or multi-layer structure comprising one or more, or a combination of any known geomembrane material, including but not limited to high density polyethylene (HDPE), linear low density polyethylene (LLDPE), polyvinyl chloride (PVC), flexible polypropylene (fPP), chlorosulphonated polyethylene (CSPE), ethylene-propylene diene monomer (EPDM), bituminous geomembrane (BGM)), and polyurea (PU). The membrane material may be reinforced or not reinforced.

In one embodiment, the membrane material comprises a high performance reinforced geomembrane material. The reinforcement for the geomembrane material is not particularly limited by the present subject matter and can include one or more of heavy dense scrim, woven or non-woven fabric, staple fibers, or continuous fibers for example. The membrane material may also include various additives, such as UV stabilizers for example, to extend the service life of the material.

A suitable membrane material is 8228 XR-3, 8130 XR-5, 8138 XR-5, 6730 XR-5, and 8146 XR-5 Reinforced Geomembranes, which are available from Seaman Corporation of Wooster, Ohio, and which are multi-layer constructions including PVC coated polyester or nylon fabric.

As can be seen, the sump 10 includes a base 100 and sidewalls 110 extending up from the base 100. The sump 10 is shown to be in the shape of a substantially rectangular box with an open top 120, and comprising a substantially rectangular base 100 having four edges, each edge of the base 100 having a sidewall 110 extending therefrom. The sump 10 is formed by creating edge seams 15 between the four sidewalls 110 that define edges 140 of the box-shaped sump 10. The base 100 and sidewalls 110 cooperate to define a reservoir 90 (i.e. "interior" 90 of sump 10) for containing water. When the vault is constructed, the sidewalls 110 may extend upward from a perimeter of the base 100, forming a dihedral angle between the base 100 and a sidewall of about 90°. It will be appreciated however that the sidewalls 110 may form dihedral angles that deviate from 90°, for example from about 70°-110°, from about 80°-100°, or from about 85°-95°.

As shown in FIG. 1, the sump 10 has a height H, width W, and length L, which define a volume of the reservoir 90. It will be appreciated that the size and shape of the sump 10 can be varied within the scope of the invention. In one exemplary embodiment, the height H of the sump 10 is about 36 inches, the width W is about 55 inches, and the length L is about 65 inches. It will be appreciated that the dimensions of the sump 10 are merely exemplary for defining a reservoir 90 of approximately 500 gallons that can accommodate up to sixteen matrices. The matrices can be for example, ECO-BLOX water matrices fabricated by Atlantic Water Gardens of Mantua, Ohio, each having a height of about 17.5 inches, a width of 27.5 inches, and a length of about 16 inches. The 500 gallon reservoir 90 can then accommodate sixteen matrices of this size in a stacking arrangement of 2 matrices high (i.e. corresponding to the 36 inch height H of the sump), 2 matrices wide (i.e. corresponding to the 55 inch width W of the sump), and four matrices long (i.e. corresponding to the 65 inch length L of the sump).

The dimensions (H, W, L) of sumps that have different storage capacities, that utilize different water matrices, or utilize different matrix stacking arrangements will vary from the exemplary dimension recited herein, and are contemplated to be part of the present subject matter. For example, the respective sumps shown in FIGS. 2 and 3 may have different sizes from each other due to matrices 30 in FIG. 2 being stacked two matrices high, and matrices 30 in FIG. 3 being stacked three matrices high. As will be appreciated, the matrices 30 will be closely stacked as shown for example in FIGS. 2 and 3 so as to minimize the total volume of the stacked matrices. This allows the sump to be prefabricated to a size that is within tight dimensional specifications, thus limiting the amount of wasted membrane material.

In one embodiment, the sump 10 includes a hem 200 (FIG. 1) around the perimeter of a top edge 190 of the sump 10, which is included for offering increased durability and thickness to the top edge 190 of the sump 10. The hem 200 may be formed by folding the top edge 190 of the sump 10 upon itself, which may be secured by welding or with a mechanical fastener. A hem width of 1" is presently preferred, but other widths could be utilized, if desired.

Figures 4, 5:
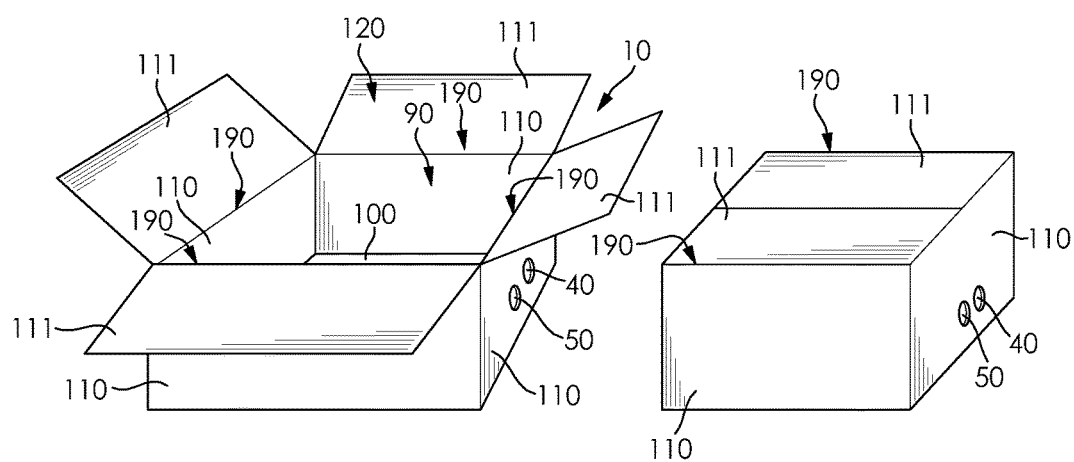
FIG. 4 is a schematic perspective view of a sump including flaps for covering an open top of the sump according to an embodiment of the invention.
FIG. 5 is a schematic perspective view of the sump of FIG. 4 having the flaps positioned to cover the open top of the sump.

In another embodiment as shown in FIGS. 4 and 5, the sump 10 includes flaps 111 extending from the sidewalls 110 at the top edge 190 of the sump 10. The flaps 111 are shown if FIG. 4 to be in an open position, i.e. not covering the open top 120 of the sump 10, and are shown in FIG. 5 to be in a closed position, i.e. covering the open top 120 of the sump 10. The flaps 111 may be integrally formed and cut from the same membrane material that forms the sump 10, or may be attached to the top edge 190 of the sump 10 by welding, mechanical attachment, or the like. As shown, the sump 10 includes four flaps, one flap extending from each of the four sidewalls 110. In accordance with the present invention, the sump 10 can include one or more flaps 111, for example one, two, three, or four flaps as desired. The flaps 111 of the sump 10 are used to cover the open top 120 of the sump 10 as shown for example in FIG. 5 by folding the flaps 111 over the open top 120. The flaps 111 can be secured in the closed position (FIG. 5) by using hook-and-loop fasteners. It will be understood that the flaps 111 can be used either with or without also using a lid 20 to cover the open top 120 of the sump 10, wherein the lid 20 can be positioned over the closed flaps 111 (FIG. 5).

In accordance with the present subject matter, the lid 20 is used to cover the open top 120 of the sump 10. The lid can be formed form the same membrane material as described for the sump, or can include a water permeable geotextile fabric.

It will be understood that in FIG. 1, the lid 20 is shown in an inverted state. As indicated by the arrow in FIG. 1, the lid 20 is transposed from the inverted state in order to be positioned to cover the open top 120 of the sump 10. The lid 20 can include a top portion 230 generally sized to correspond to the size of the open top 120 of the sump 10. The lid 20 may optionally include a skirt 240 extending down (inverted in FIG. 1) from the top portion 230. In one embodiment, the skirt 240 of the lid 20 may extend over the hem 200 of the sump 10 when the lid 20 is placed on the sump 10 to cover the open top 120 of the sump 10.

As shown in the embodiments illustrated in FIGS. 1 and 6, the lid 20 may be secured to the sump 10 by means of fasteners 260 on the lid 20, which can be removably attached to corresponding fasteners 220 on the sump 10 at the installation site. The fasteners 220 of the sump 10 may be aligned with, and releasably connected to the fasteners 260 on the lid 20 when the lid 20 is positioned to cover the open top 120 of the sump 10. The fasteners 220 and 260 may comprise mechanical fasteners, such as hook-and-loop fasteners (e.g. VELCRO®) for example, which can be sewn at predetermined mating locations to the sump 10 and lid 20. The number and spacing of the fasteners 220 and 260 is not critical. In one embodiment, fasteners 220 and 260 are spaced such that they are 2 to 3 feet apart about the perimeter of the open top 120 of the sump 10 and about the perimeter of the lid 20.

In another embodiment, one or more of the lid 20 or the sump 10 does not include fasteners 220 or 260. In this embodiment, the lid 20 may be simply positioned to cover the open top 120 of the sump 10 without being secured to the sump 10.

In one embodiment, the lid 20 includes one or more flaps 250 that extend from a perimeter of the top portion 230 of the lid 20, as shown for example in FIG. 6. The flaps 250 of the lid 20 are contrasted from the skirt 240 in that the flaps 250 do not include edge welds 21 (FIG. 1) between them and are therefore not attached directly to each other. In this embodiment, as the lid 20 is placed over the open top 120 of the sump 10, the flaps 250 of the lid 20 are extended down the sidewalls 110 of the sump 10 in order to provide an end user with a certain amount of leeway in covering the plurality of matrices within the reservoir of the sump. This is pertinent because larger sumps and increased number of matrices within the sump increase the likelihood that the sump and lid will not properly fit around the matrices. Flaps 250 provided on the lid 20 offer increase leeway to an installer with regard to properly fitting the matrices inside the sump and covering them with the lid. In this embodiment, the lid 20 can include fasteners 260 and the sump 10 can include corresponding fasteners 220 for releasably securing the flaps 250 to the sump 10.

The system 1 can also include a plurality of matrices 30, which can comprise a general block structure (e.g., ECO-BLOX) having within the mass of the matrix 30 a pattern of rigid structural supports and void spaces defined between the structural supports. The void spaces between the structural supports together define a total void space for the matrix 30, which is configured to receive water. Because they are configured to receive water, the matrices 30 are also referred to herein as "water matrices" 30.

The matrices 30 may include plastic matrices, which can be assembled at the installation site and placed into the interior 90 of the sump, or may be made from other material or assembled remote from the installation site. It will be appreciated that alternative water matrices could be utilized, which have a different shape (e.g., cube, cylinder, various regular polygonal-shaped boxes, pyramid, etc.), a different construction (e.g., diagonal cross members) or a different volume of total void space, if desired.

A predetermined number "n" of matrices of predetermined size are positioned in the interior 90 of the sump 10, as shown for example by the arrow in FIG. 1, in order to structurally support the sump 10 and lid 20 and to maintain a predetermined volume in the reservoir 90 for containing water. The height H, width W, and length L of the sump 10 can be adjusted so as to match the volume to be occupied by the predetermined number n of matrices 30 of a predetermined size being placed therein.

In one embodiment, each matrix 30 has a water containment volume that is equal to the combined total of void spaces in the matrix 30, which can be for example, approximately 31.5 gallons. In this aspect, the sump 10 is configured to accept sixteen matrices in its interior 90, making the combined void volume of the sixteen matrices approximately 500 gallons. Prefabricated sumps 10 are contemplated such that when filled with 16, 32 or 64 water matrices 30, the sumps 10 provide storage volumes of about 500, 1,000 or 2,000 gallons of water, respectively.

The system 1 may also include an inlet conduit 70 and an outlet conduit 80. The inlet conduit 70 may be attached to an inlet port/aperture 40 in the sump 10 for delivering water to the reservoir 90. The outlet conduit 80 may be attached to an outlet port/aperture 50 in the sump 10 for diverting water from the reservoir 90 to an exterior of the sump 10. The inlet and outlet conduits 70, 80 may include one or more valves to regulate the flow of water therethrough.

The inlet aperture 40 and the outlet aperture 50 may be preformed through the membrane material forming the sump and/or lid. In several embodiments, the sump 10 may be prefabricated with the inlet aperture 40 and the outlet aperture 50 at a location that is remote from the installation site. As shown in FIG. 1, the inlet conduit 70 and the outlet conduit 80 are fluidly connected to the reservoir 90 of the sump 10 through the inlet aperture 40 and the outlet aperture 50, respectively. This fluid connection allows water to be delivered to the reservoir 90 through the inlet aperture 40, for example through the collection of rainwater from a downspout or other source; and allows water to be diverted from the reservoir 90 through the outlet aperture 50, for example to provide water for gardening, farming, or other needs.

In this respect, in one embodiment the system 1 also includes a pump 60 fluidly connected to the outlet conduit 80, for driving water from the reservoir 90, through the outlet aperture 50, and to the exterior of the sump 10. The pump 60 is not particularly limited by the present subject matter and can be associated with a pump housing unit 62 (FIG. 2), wherein the pump is located inside the pump housing unit 62. The pump housing unit 62 (i.e. "pump vault") may be utilized to protect the pump located therein from damage. The pump may include any manually powered or machine powered pump as desired.

The pump vault 62 (which contains a pump) may be positioned at an exterior 91 of the sump 10 as shown in FIG. 2, or the pump 60 may be located in the interior 90 of the sump 10 as shown in FIG. 3. As shown in FIG. 2, the matrices 30 are stacked two matrices high. In this embodiment, the pump vault 62 may have a height such that a pump access 61 is accessible from above ground level 270 when the pump vault 62 and pump (not shown) is located at the exterior 91 of the sump 10. As such, the outlet conduit 80 is fluidly connected to the reservoir 90 through the outlet aperture 50 formed in a sidewall 110 of the sump 10.

As shown in FIG. 3, however, the matrices 30 are stacked three matrices high (it will be appreciated that in other embodiments, the matrices could be stacked higher or lower than three high). In this embodiment, a pump vault may have a height such that it would not be accessible from above ground level 270 if the pump vault were located at the exterior 91 of the sump 10. In this scenario, the pump 60 itself may be located in the reservoir 90 of the sump 10, and the outlet conduit 80 may be fluidly connected to the reservoir 90 through an outlet aperture 50 formed in the lid 20, such that a pump access 61 is accessible from above ground level 270. In accordance with the present subject matter, the sump 10 and/or the lid 20 may include one or more apertures as desired.

The present invention also provides methods of making the sump and lid at a location remote from the installation site. With particular reference to FIGS. 7 and 8, the sump 10 may be formed from two pieces (i.e. first sump half 11 and second sump half 12) of membrane material, e.g. high performance reinforced geomembrane material. The two sump halves 11 and 12 may be cut from a roll of flat membrane material, preferably by using CNC technology so as to minimize waste of the membrane material. The sump halves 11 and 12 are shown in FIGS. 7 and 8 to include dotted lines, which represent folds to be made in the material in constructing the sump.

The first sump half 11 includes a seam edge 13, which will be attached to the seam edge 14 of the second sump half 12. The two sheets are joined by bringing together seam edge 13 with seam edge 14 as indicated by the arrows in FIGS. 7 and 8. Seam edge 13 can be mated with seam edge 14 using a weld, for example a hot air welding process in which hot air is blasted at the mating seam edges 13, 14 of the two pieces 11, 12 of membrane material, and then the hot surfaces are rolled together under high pressure to fuse the pieces of membrane material together to form a water-tight seam.

The central seam created by welding seam edge 13 with seam edge 14 may also be formed by creating a welded fillet seam, a flat seam, a dual or single track hot wedge seam, a double or single track hot air seam, a chemical fusion seam, or a chemical or contact adhesive seam.

As used herein, "weld", "welding", or cognate terms refers to a bond formed between portions of membrane material using heat, chemicals, or adhesives, and which creates a permanent attachment between the portions of membrane material. By "permanent attachment," it is meant a bond that cannot be broken without resulting in residue being left on the membrane material, or without resulting in damage to one or both portions of the membrane material being welded together. Welding can include a radio-frequency (RF) welding technique in which high-frequency radio waives are directed to a localized area that is under pressure, ultrasonic welding, heat welding, chemical welding, soldering, brazing, or the use of an adhesive for example.

A central seam width of approximately 1.25" is suitable. It will be appreciated that the width of the central seam is not absolutely critical, and that other seam widths could be utilized provided they result in a central seam that functions acceptably. It will be appreciated that larger sumps may require more than one central seam formed between more than two pieces of membrane material.

As seen in FIGS. 7 and 8, the first sump half 11 comprises base half 100A, first sidewall 150 including top edge 151, second sidewall half 160A including top edge half 161A, and fourth sidewall half 180B including top edge half 181B. The second sump half 12 comprises base half 100B, second sidewall half 160B including top edge half 161B, third sidewall 170 including top edge 171, and fourth sidewall half 180A including top edge half 181A. The first sidewall 150 also includes the inlet aperture 40 and the outlet aperture 50, although these could be included in other locations in the sump 10, or even in the lid 20.

In the embodiment shown in FIG. 7, the membrane material of the first sump half 11 is cut such that the first sidewall 150 includes two lateral edges 152 that are disposed on opposite sides of the first sidewall 150. One lateral edge 152 includes welding extension 153, which is discussed in more detail herein. The second sidewall half 160A comprises lateral edge 162, including welding extension 163, which is discussed in more detail herein. The fourth sidewall half 180B includes lateral edge 182.

In this embodiment, the membrane material of the second sump half 12 is cut such that the second sidewall half 160B includes lateral edge 162. The third sidewall 170 includes two lateral edges 172 that are disposed on opposite sides of the third sidewall 170. One lateral edge 172 includes welding extension 173, which is discussed in more detail herein. The fourth sidewall half 180A comprises lateral edge 182 including welding extension 183, which is discussed in more detail herein.

In this embodiment, the membrane material comprising the first sump half 11 joined to the second sump half 12 such that second sidewall halves 160A and 160B collectively define a second sidewall of the sump. Likewise, fourth sidewall halves 180A and 180B collectively define a fourth sidewall of the sump. The joined sump halves 11, 12 are formed into an open-topped box by bringing together lateral edges of adjacent sidewalls as shown by the arrows in FIG. 7, and welding the lateral edges together to form vertical edge seams 15 (FIG. 1). More specifically, welding extension 153, which defines one lateral edge 152A of first sidewall 150, is welded to lateral edge 182B of the fourth sidewall. Welding extension 163, which defines one lateral edge 162A of the second sidewall, is welded to lateral edge 152B of the first sidewall 150. Welding extension 173, which defines one lateral edge 172A of the third sidewall 170, is welded to lateral edge 1626 of the second sidewall. Welding extension 183, which defines one lateral edge 182A of the fourth sidewall, is welded to lateral edge 1726 of the third sidewall 170.

The joining of these lateral edges define edge seams 15, which extend from the corners/vertexes 130 of the sump to the top edge 190 of the sump, and thereby define the edges 140 of the box-shaped sump 10. These lateral edges may be joined by welding, including by using a radio-frequency (RF) welding technique. The welding causes the membrane material to fuse together to form a water-tight seal. Edge seam widths can typically be about 1" to 1.25" wide. Again, it will be appreciated that the width of the edge seams 15 is not absolutely critical, and that other seam widths could be utilized provided they result in edge seams 15 that function acceptably. The edge seam can be any of those types as described for the central seam.

It will also be appreciated that in an alternative embodiment, as shown for example in FIGS. 8-12, the edges 140 of the prefabricated sump 10 could be formed by folding the membrane material. The folded material could be secured in place using a sonic weld at a top edge, or by using mechanical fasteners such as clips or clamps.

Figure 9:
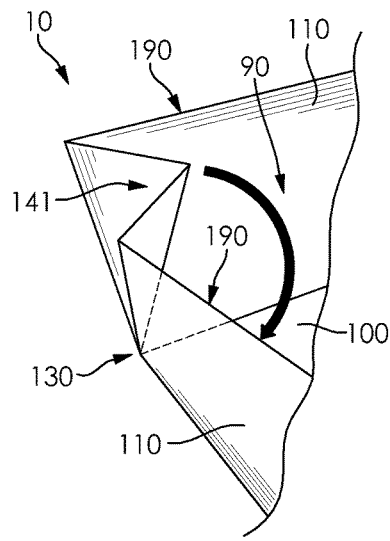
FIG. 9. is a schematic perspective view of exemplary folds in the membrane material of FIG. 8 that are made to form an edge of the sump.

More specifically, in the embodiment shown in FIG. 8, the joined sump halves 11, 12 are formed into an open-topped box by making folds in the membrane material as shown for example in FIGS. 9-12. In one aspect (FIGS. 9-10), an edge 140 of the sump 10 is formed by upwardly folding the sidewalls 110 with respect to the base 100, and creating an inward fold 141 at a corner of the membrane material as shown in FIG. 9. The inward fold 141 is then positioned against an interior surface of a sidewall 110 as shown by the arrow in FIG. 9, so as to lay flat against the interior surface of the sidewall 110 and to thereby define three overlapping top edge portions indicated at 143. The three overlapping top edge portions 143 are secured together by welding or with a fastener.

Figure 10:
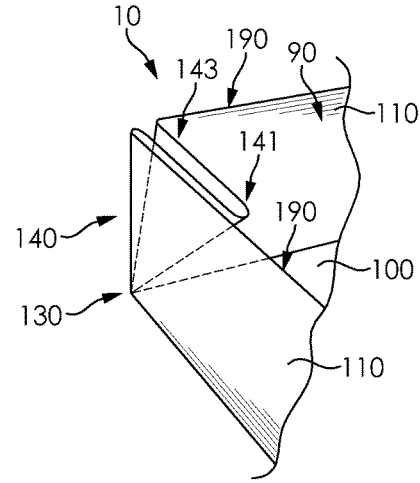
FIG. 10 is a schematic perspective view of the edge of the sump formed by making the exemplary folds in the membrane material of FIG. 9.
Figure 11:
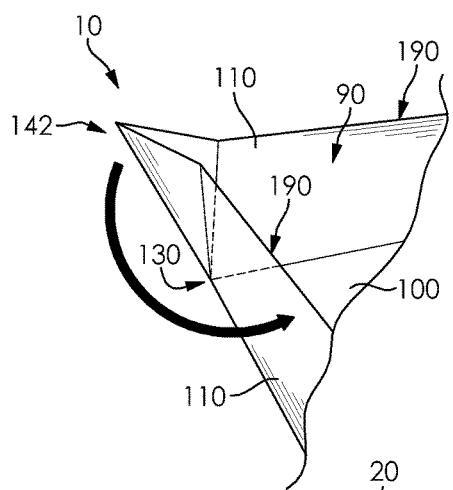
FIG. 11 is a schematic perspective view of other exemplary folds in the membrane material of FIG. 8 that are made to form an edge of the sump.
Figure 12:
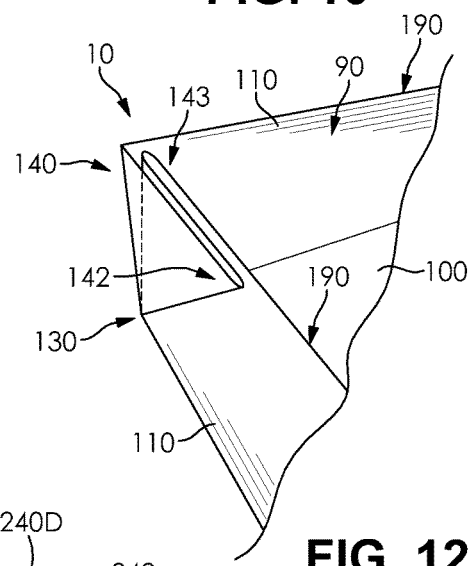
FIG. 12 is a schematic perspective view of the edge of the sump formed by making the exemplary folds in the membrane material of FIG. 11.

In an alternative aspect (FIGS. 11-12), an edge 140 of the sump 10 is formed by upwardly folding the sidewalls 110 with respect to the base 100, and creating an outward fold 142 at a corner of the membrane material as shown in FIG. 10. The outward fold 142 is then positioned against an exterior surface of a sidewall 110 as shown by the arrow in FIG. 10, so as to lay flat against the exterior surface of the sidewall 110 and to thereby define three overlapping top edge portions indicated at 143. The three overlapping top edge portions 143 are secured together by welding or with a fastener.

In several embodiments, the inlet aperture 40 and the outlet aperture 50 are formed in the side of the prefabricated sump, most preferably at the remote site, for receiving plumbing fittings (e.g., an inlet from a water source such as a downspout and an outlet to a pump stored external to the water-containing vault). Forming the apertures at the remote site allows for precision sizing (e.g., through the use of CNC technology) and positioning/placement of the apertures. Alternatively, the location of the apertures can be indicated on the material at the remote prefabrication site, or partially cut at the remote prefabrication site, with final cutting to be accomplished at the installation site. The plumbing fittings installed at the apertures can capture and compress the geotextile membrane material on both sides of the membrane material and about the perimeter of the apertures, thereby forming a water-tight seal.

In several embodiments, the lid 20 is prefabricated in a manner similar to the sump 10. That is, the lid may be formed from one or more pieces of water impermeable membrane material similar to the sump 10. In these embodiments, the system is considered a "closed system" wherein water will enter the reservoir 90 only through the inlet aperture 40. If more than one piece is used to form the lid, the multiple pieces may be connected with a central seam formed between the pieces similar to that as described for the sump 10. For covering the open top of smaller sumps, the lid may be formed from one piece of membrane material and may not require the use of a central seam.

Figure 13:
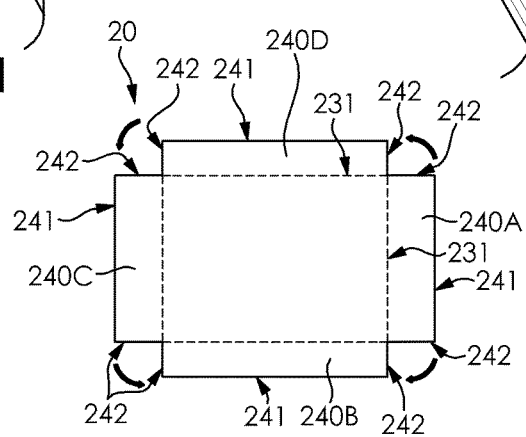
FIG. 13 is a top view of an exemplary cut pattern of a membrane material prior to assembly into a lid according to an embodiment of the invention.

In one embodiment and with reference to FIG. 13, the lid may be formed from a membrane material comprising a top portion 230, and several skirt portions 240A-240D extending from the top portion 230. The skirt portions 240A-240D define lateral edges 242 and bottom edges 241. The skirt portions 240A-240D are integral with, and formed from the same piece of membrane material as the top portion 230. The membrane material is shown in FIG. 13 to include dotted lines, which represent folds to be made in the material in constructing the lid 20, or for coving the open top 120 of the sump. The lid is formed by folding the membrane material along the dotted lines to bring together adjacent lateral edges 242 of skirt portions 240A-240D, as shown by the arrows in FIG. 13. The adjacent lateral edges 242 of skirt portions 240A-240D are connected together, for example by welding, to form edge seams 21 as shown in FIG. 1, to thereby define the skirt 240 of the lid 20 extending down (inverted in FIG. 1) from the top portion 230.

In another embodiment, skirt portions 240A-240D of the lid 20 may not be connected together at their adjacent lateral edges 242, but rather the skirt portions 240A-240D may be left unconnected to thereby define flaps 250, as shown in FIG. 6. The flaps 250 do not include edge welds 21 between them, and therefore are not directly connected to each other.

In another embodiment, the lid is formed from a geotextile fabric, or other water permeable fabric, that can be used to cover the open top of the sump. In this embodiment, the system is considered an "open system", wherein water will be able to flow through the lid 10 and into the reservoir 90 of the sump 10. Soil and other debris will be partially filtered from the water entering the reservoir 90 as the water passes through the lid 20. In this embodiment, the use of an inlet aperture 40 may not be required for delivering water to the reservoir 90.

It will be appreciated that as an alternative to a two-piece pre-constructed unit (i.e., an open-topped box and separate lid), it would also be possible to form a one-piece water-storage vault, in which the lid is integral to the sump base, or is welded to the sump base at the remote fabrication site. In such an embodiment, one or more sections of membrane material would extend from sidewalls of the sump. The membrane material could be folded and/or welded to form the sump and integral lid. After the water matrices are placed inside the sump potion, the integral lid portion would be positioned to cover the open top of the sump and to cover the water matrices.

In accordance with a method of the invention, a sump and lid are delivered to the installation site; the sump and lid having been prefabricated at a location remote from the installation site, preferably at least two days prior to installation. At the installation site, a cavity is excavated in the ground of sufficient size to receive the sump and the appropriate number of water matrices that are to be received within the sump. Optionally, a piece of protective geotextile fabric is placed in the excavated cavity before the sump is placed therein. The sump is then placed into the excavated cavity and filled with water matrices until it has been filled to capacity. The water matrices can be assembled on-site. The water matrices are placed directly on the bottom inside surface of the sump (i.e. the inside surface of base 100) with no protective layer or material between the matrices and the bottom inside surface of the sump.

If the sump was provided with prefabricated apertures for plumbing fittings, then the plumbing fittings are attached (this can be done prior to or during installation of the water matrices). If the sump was not provided with prefabricated apertures for plumbing fittings, then such apertures are created at the installation site, and the plumbing fittings are attached. The apertures may be oriented in proximity to a pump, which may be internal or external to the vault formed by the sump (filled with matrices) and the lid. If the pump is located inside the vault, it will be preferable to place the pump is a closely packed arrangement between or adjacent to the matrices.

A pump access is at or above ground level, which allows for access to the pump for the connection of suitable plumbing fixtures, for example. Once the lid has been secured to the sump using the mating fasteners, the entire vault can be covered with soil or other material. Because of the strength of the matrices, and the structural support they offer to the flexible membrane material comprising the sump, the vault can thereby support a fairly significant load. If the load is adequately distributed around the vault, the vault can then be installed under parking lots or yards or other landscaping features.

Prefabrication of the sump and lid remote from the installation site significantly reduces waste of membrane material and improves the speed and ease of installation of the underground water-storage system. Furthermore, pre-testing of the sump ensures that a water-tight sump is delivered to the installation site.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A vault for storing water underground, the vault comprising:
   a sump formed of flexible, water impermeable membrane material that has been joined together at weld seams to form a box having an internal volume that defines a reservoir for water, said box including a base with a perimeter, a plurality of sidewalls extending upwardly from the perimeter of the base, said internal volume being sized to receive a predetermined amount of structural support matrices; and
   a lid configured to cover an opening at a top of the sump, said lid comprising a plurality of flaps that extend from a perimeter of a top portion of the lid, said plurality of flaps not being attached directly to each other;
   wherein fasteners are provided on the sump and corresponding fasteners are provided on the flaps of the lid for releasably securing the flaps to the sump,
   wherein at least one of the sump or the lid includes at least one aperture that provides fluid communication between the internal volume reservoir and an exterior of the sump, and
   wherein the sump and lid are in a folded or rolled condition and contained within a container for shipment.

2. The vault according to claim 1, wherein the lid is formed of a water-permeable material.

3. The vault according to claim 1, wherein the lid is formed of a water impermeable membrane material.

4. The vault according to claim 1, wherein the at least one aperture is an outlet aperture for receiving a conduit connected to a pump for removing water collected in the reservoir to the exterior of the sump.

5. The vault according to claim 4, further comprising an inlet aperture for receiving a conduit that delivers water from the exterior of the sump to the reservoir.

6. The vault according to claim 1, wherein the water impermeable membrane material is a reinforced geotextile membrane material.

7. The vault according to claim 1, wherein at least two of the plurality of sidewalls meet at a vertical corner seam where the flexible, water impermeable membrane material has been joined together by welding.

8. The vault according to claim 1, wherein each of the plurality of sidewalls terminates in a top edge.

9. The vault according to claim 8, wherein a hem is formed at the top edge.

10. A method for installing a water storage system below ground, the method comprising:
    excavating an opening in the ground at an installation site;
    receiving a vault for storing water underground according to claim 1;
    removing the sump and lid from the container at the installation site;
    placing the sump into the opening in the ground;
    disposing a predetermined amount of structural support matrices into the internal volume of the pre-fabricated sump;
    covering an opening at a top of the sump with the lid;
    fastening the lid to the sump using the fasteners provided on the sump and corresponding fasteners provided on the flaps; and
    covering the lid-covered sump with a fill material to conceal the lid-covered sump from view at ground level.

11. The method according to claim 10, wherein vault is received at a location other than the installation site, and is transported to the installation site in the container.

12. The method according to claim 10, further comprising disposing a conduit through an outlet aperture in the sump, said conduit being connected to a pump for removing water collected in the reservoir to an exterior of the sump.

13. The method according to claim 12, further comprising disposing a second conduit for delivering water from the exterior of the sump to the reservoir through an inlet aperture formed in the sump.

14. A kit of materials for a below ground a water storage system, the kit comprising:
   a vault according to claim 1;
   a predetermined amount of structural support matrices for the vault; and
   a pump.

15. The kit according to claim 14 further comprising at least one conduit.

* * * * *